Jan. 5, 1954     C. H. HANNEMANN     2,664,610
PARACHUTE QUICK-RELEASE DEVICE
Filed Sept. 30, 1949

INVENTOR
CARL H. HANNEMANN
BY
*Marty Graham*
ATTORNEYS

Patented Jan. 5, 1954

2,664,610

UNITED STATES PATENT OFFICE 2,664,610

PARACHUTE QUICK-RELEASE DEVICE

Carl H. Hannemann, Los Angeles, Calif.

Application September 30, 1949, Serial No. 118,909

2 Claims. (Cl. 24—201)

This invention has to do with devices for connecting parachute risers to a harness worn by a parachutist, and has as a principal object the provision of a device which not only positively and securely maintains a parachute riser connected with the straps or harness worn by a parachutist, prior to and while the latter is descending, but also enables the parachutist to quickly and positively release the riser upon landing.

As is well known, unless a parachutist is able quickly to release the riser under unfavorable conditions upon landing, he is apt to be seriously injured by being dragged over the ground by the still distended canopy, or is apt to be drowned by being dragged into water, particularly when there is the presence of strong air currents. Devices for the purpose of effecting such release have been proposed, but have possessed shortcomings either as to the difficulty of effecting instant release under unfavorable conditions, or they have been of such construction that accidental release is apt to occur prematurely.

It is therefore an object of my invention to provide a device which overcomes those shortcomings of prior art devices.

It is also an object to provide a device of this character which affords novel and efficient means for adjustably connecting thereto the straps or harness worn by the parachutist.

Other objects and advantages which are more or less subordinate to those above mentioned will appear hereinafter.

Without intending thereby to limit the broader scope of my invention as defined by the appended claims, I shall now describe it in one of its preferred embodiments, for which purpose I shall refer to the accompanying drawings, wherein:

Figure 1:
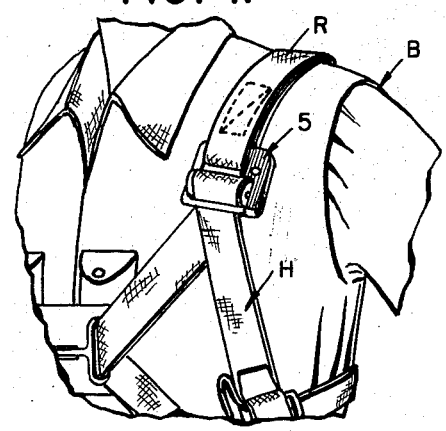
Fig. 1 is a perspective view showing my device connecting a riser to the harness worn by a parachutist.

Referring now to the drawings, I show in Fig. 1 the body B of the parachutist, wearing the usual straps or parachute harness H. R denotes one of the risers which is attached at one end to the harness and attached at its other end to the canopy, (not shown). My invention relates to the quick release connector device per se generally denoted by the numeral 5, which serves to releaseably connect a riser to the harness.

The device 5 comprises a U-shaped frame 15 having side legs 16, 17, a bottom cross-bar 18 and a cross-bar 20 substantially midway between the ends of the side legs. Cross-bars 18 and 20 are preferably cast integral with the side legs. A top cross-bar 25 is detachably carried by the frame as will now be explained.

Cross-bar 25 has a left end 25a fitted in a socket 26 in side leg 16. It will be observed that the end 25a of the cross-bar is curved at its underside portion as shown at 25b, to prevent said end from binding in the socket during its escape therefrom.

Figure 7:
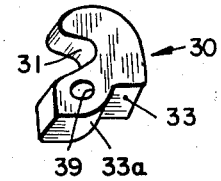
Fig. 7 is a perspective of the keeper element of the device.

The opposite or right end 27 of bar 25 presents a four-sided bevel as shown at 28, so as to taper toward its right end, said end terminating in a rounded surface 27a to facilitate its escape from the keeper 30 now to be described. The keeper 30, the shape of which is best shown in Fig. 7, presents a socket 31 opposed to socket 26, socket 31 being defined by a rounded surface. The keeper presents a downwardly facing shoulder 33 and is pivoted between bifurcations 35 presented by side leg 17. The pivotal mounting of the keeper is effected by a pintle 37 which extends through concentric holes 38 in bifurcations 35 and through a hole 39 in the keeper. The bottom surface of the keeper curves downwardly and inwardly from the shoulder 33, as best shown at 39, to permit the keeper to swing outwardly about its pivot.

Figure 2:
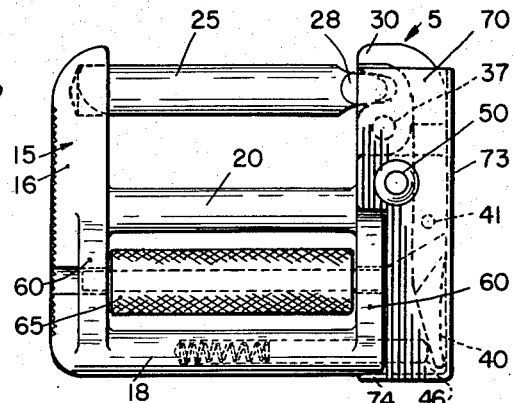
Fig. 2 is a side elevation of my connector device, with its protective guard mounted thereon.
Figure 4:
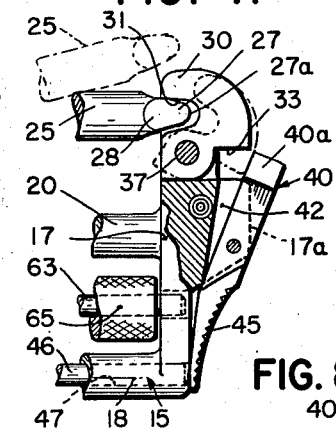
Fig. 4 is a fragmentary view.
Figure 3:
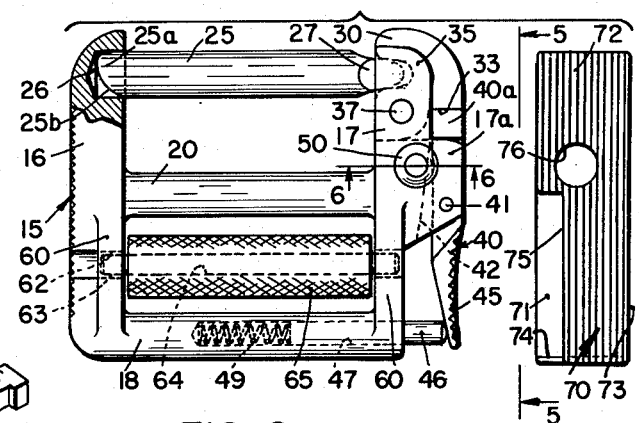
Fig. 3 is a view like Fig. 2, except that the guard is not mounted thereon and a portion is shown in section.

The keeper is normally retained in position locking the cross-bar 25 (Figs. 2, 3, and 4) by a latch 40 which is pivoted by pintle 41 in a longitudinal outwardly opening slot 42 provided in an outwardly projecting portion 17a of leg 17. The latch has a top end cross-portion providing lateral projections 40a which overlie the top surfaces of the projection 17a when the latch is in locking position (Figs. 2 and 3). Also, when in locking position, the top end of the latch engages shoulder 33 of the keeper to prevent the keeper from swinging outwardly when the latch is in locking position. The lower end of the latch presents a knurled finger engaging portion 45, yieldably urged outwardly by a plunger 46 mounted in an axial bore 47 in cross-bar 18. A compression spring 49 urges the plunger outwardly.

A spring loaded detent 50 is reciprocally mounted in a transverse hole 51 in side leg 17, and a compression spring 52 bears between the reduced inner end of the detent and a set screw 53 plugging the bottom end of hole 51. The purpose of the detent will be later described.

For adjustably lockably securing the device 5 to the harness H, I provide a feature which will now be described.

Figures 5, 8:
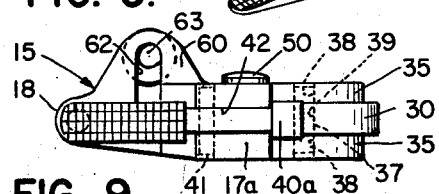
Fig. 5 is an end view taken on line 5—5 of Fig. 3.
Fig. 8 is a perspective view of the latch element.
Figure 6:
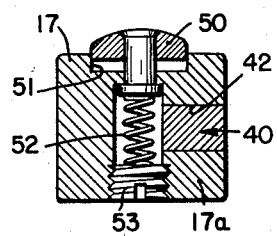
Fig. 6 is an enlarged section taken on line 6—6 of Fig. 3.

Each of the side legs 16, 17 has a laterally projecting boss 60 and in each of said legs I provide an elongated slot 62, extending into said boss, in which slots the respective outer ends of a pivot pin 63 which serve as trunnions, are slideably mounted. The pin 63 is frictionally engaged in an axial bore 64 provided in a knurled roller 65 rotatably disposed between cross-bars 18 and 20. Thus, the inner ends of the slots 62 are so positioned that when the pin 63 engages said inner ends, the axis of the roller is substantially in plane with the longitudinal axis of the legs 16, 17. As will be apparent, when the ends of the pivot pin 63 are moved along the slots into engagement with the extreme outer ends of the slots, as indicated by the broken line position 63a in Fig. 5, the axis of the roller is laterally offset from the plane of the axes of the legs so that the clearance between the periphery of the roller and the cross-bars is greater than when said ends of the pivot pin are in engagement with the inner ends of the slots. Thus, to mount the harness on the roller, the roller is moved to said outer position in which said clearance is greatest, which renders it easy to pass the harness around the roller between the cross-bars. The harness bears in tension against that surface of the lower cross-bar 18 which is adjacent the inner ends of the slots, which causes that portion of the harness which passes around the roller to bind between the cross-bars and roller. To adjust the harness, the harness is relieved of tension and the pivot pin is moved outwardly along the slots to increase the clearance between the roller and cross-bars, and then the harness may be longitudinally adjusted with ease by rotation of the roller. While such adjustment and mounting are thus rendered extremely easy, the harness is securely held in any position of adjustment.

To positively prevent the latch from being accidentally or prematurely actuated to release the cross-bar 25 from the frame, I provide a channeled guard 70, which has parallel sides 71, 72, a back wall 73 and a bottom end wall 74, being open at its top end and front side. A portion of side wall 73 is cut away at 75 to provide clearance for the relatively widened portion of the leg 17. A round hole 76 is provided in side wall 73 to expose the detent 50 for engagement by the finger of the user. As best shown in Fig. 2, the guard is frictionally engaged over the leg 17 with the detent exposed through and yieldably projecting into hole 76, and with the end wall 74 additionally concealing the plunger 46. The side walls 71, 72 are knurled to facilitate gripping them between the fingers. Detent 50 prevents accidental escape of the guard 70.

In use, the device 5 is mounted as the connecting member between a riser and the harness, and the guard 70 is mounted on side leg 17 in covering relationship to the keeper and latch. As the parachutist approaches the ground, or immediately after he lands, he removes the guard 70 by pressing the detent 50 and pulling outwardly on the guard thus removing it and exposing the latch. When desired, the parachutist then merely presses inwardly on the portion 45 of the latch, which permits the tension on the riser to pull the cross-bar 25 from the socket 31 in the keeper, the keeper being swung about its pivot by the camming action of the curved beveled end of the cross-bar 25. As soon as the cross-bar is freed from socket 31, it swings upwardly and its opposite end 25a is withdrawn from socket 26 by the pull exerted by the riser, the curved end surface 25b facilitating such escape. The harness is thus completely detached from the riser.

Figure 9:
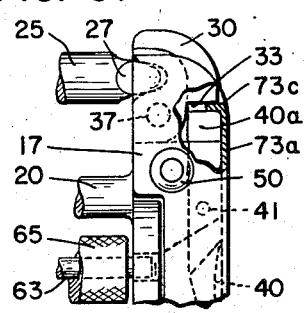
Fig. 9 is a side elevation illustrating a modified form of guard.
Figure 10:
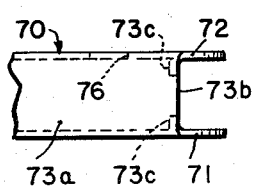
Fig. 10 is a front elevation of the guard shown in Fig. 9.

In Figs. 9 and 10 I show a modified form of guard element wherein the parts are as before described except that the rear wall 73a of the guard is cut away at its top end portion 73b and at the sides of the cutaway portion the rear wall is bent inwardly to provide bifurcations 73c which extend inwardly to overlie the laterally projecting portions 40a of the latch, whereby more positively to hold the latch and keeper against accidental or premature movement.

I claim:

1. In a device for releasably retaining a parachute riser connected to a harness, the combination of a rigid U-shaped frame having a bottom cross portion, a first side portion and an opposite second side portion, a harness engaging cross member mounted at its ends in said side portions, the first of said side portions having a socket opening towards the second side portion, a riser engaging cross member having its inner end releasably fitting in said socket, a keeper pivotally secured at one of its ends to the second side portion, said keeper having a hooked portion releasably engaging the outer end of said riser engaging cross member, a keeper member disposed beside and having its lower end portion spaced from the lower portion of the second side portion, said locking member having its upper end lockably engaging said keeper and being pivoted between its ends to the second side member whereby to disengage from said keeper when the lower end portion of said locking member is moved towards said second side member, a plunger carried by said bottom cross portion of the frame and having its outer end engaging said handle portion, spring means urging said plunger against the lower end portion of said locking member whereby to yieldably retain the hooked portion of the keeper in engagement with the outer end of said riser engaging cross member, and a guard member frictionally engaging said second side portion in covering relationship to said keeper and locking member.

2. A device of claim 1 wherein said harness engaging cross member is mounted to rotate relative to said frame.

CARL H. HANNEMANN.

References Cited in the file of this patent

UNITED STATES PATENTS

| Number | Name | Date |
|---|---|---|
| 783,064 | McCord | Feb. 21, 1905 |
| 1,463,149 | Barthelemy | July 31, 1923 |
| 2,153,077 | Clarke | Apr. 4, 1939 |
| 2,393,072 | Skinner | Jan. 15, 1946 |
| 2,405,333 | Sheridan | Aug. 6, 1946 |
| 2,469,574 | Quilter | May 10, 1949 |
| 2,574,296 | Smith | Nov. 6, 1951 |